United States Patent [19]

Brödling et al.

[11] Patent Number: 4,797,790

[45] Date of Patent: Jan. 10, 1989

[54] DIMMED MOTOR VEHICLE HEADLIGHT

[75] Inventors: Günter Brödling, Lippstadt; Franz Feyerabend, Paderborn; Peter Hubert; Franz Krähling, both of Lippstadt; Wolfgang Peitz, Erwitte; Karlernst Sewing, Lippstadt-Hörste; Diethard Schnelle, Erwitte, all of Fed. Rep. of Germany

[73] Assignee: Westfälische Metall Industrie KG, Hueck & Co., Lippstadt, Fed. Rep. of Germany

[21] Appl. No.: 862,129

[22] Filed: May 12, 1986

[30] Foreign Application Priority Data

May 10, 1985 [DE] Fed. Rep. of Germany ....... 3516812
May 10, 1985 [DE] Fed. Rep. of Germany ....... 3516813

[51] Int. Cl.[4] ....... B60Q 1/00
[52] U.S. Cl. ....... 362/61; 362/328
[58] Field of Search ....... 362/61, 80, 308, 328, 362/351

[56] References Cited

U.S. PATENT DOCUMENTS

| | | | |
|---|---|---|---|
| 1,410,077 | 3/1972 | Peck | 362/308 |
| 1,539,090 | 5/1925 | King | 362/308 |
| 1,543,079 | 6/1925 | Fraser | 362/308 |
| 1,599,958 | 9/1926 | Godley | 362/308 |
| 1,810,235 | 6/1931 | Whalen | 362/61 |

FOREIGN PATENT DOCUMENTS

| | | |
|---|---|---|
| 8430631 | 10/1984 | Fed. Rep. of Germany . |
| 2087318 | 5/1970 | France . |
| 224926 | 4/1984 | German Democratic Rep. . |
| 55400 | 11/1911 | Switzerland . |

*Primary Examiner*—Samuel Scott
*Assistant Examiner*—Noah Kamen
*Attorney, Agent, or Firm*—Horst M. Kasper

[57] ABSTRACT

A dimmed motor vehicle headlight is provided with an ellipsoidally shaped reflector, where a light source is disposed at a first focal point of the reflector. A collector lens is supported by a frame having an annular part which is connected to the reflector and where the lens is disposed behind a second focal point of the reflector. A diaphragm is provided which is in the path of the light beam ahead of the collector lens and disposed at the respective focal point of the collector lens. The diaphragm is provided adjustable and with an upper substantially horizontally running edge that generates a light-dark boundary. The diaphragm and the frame are formed as a single part. The frame is provided by a beaker shaped sheet metal piece, where a cut out floor area serves to support the lens and where arm shaped webs are cut free from a wall forming a jacket face. One of these webs is angled toward the optical axis such that its upper end edge forms the diaphragm edge for the light-dark boundary. The remaining webs of the frame provide the support arms for the frame.

27 Claims, 4 Drawing Sheets

DIMMED MOTOR VEHICLE HEADLIGHT

BACKGROUND OF THE INVENTION

1. Field of the Invention

The invention refers to a dimmed motor vehicle headlight with an ellipsoidal reflector, where a light source is disposed at a first focal point of the reflector and a collector lens is disposed behind the second focal point and is supported by an annular part of a frame connected to the reflector.

2. Brief Description of the Background of the Invention Including Prior Art

A motor vehicle headlight generally comprises an adjustable diaphragm that substantially generates with its upper horizontally running edge a light-dark boundary for the outcoming light. This construction is associated with the advantage that the diaphragm edge generating the lightdark boundary can be adjusted to be located exactly at the focal points of the collector lens, since the focal point of the collector lens is situated in a large tolerance region.

Such a dimmed motor vehicle headlight is known from the German Petit Patent DE-GM No. 84 30 629. The frame and the diaphragm according to this teaching are provided as two parts, and they are made by a die casting process. The frame has the shape of a table and connects the reflector and the collector lens solidly to a single unit. The diaphragm is shiftably guided in the direction of the optical axis by two legs of the table, and after the adjustment of the diaphragm, it is fixed in position by screws at the legs of the table. The adjusting mounting of the diaphragm as taught in the reference is complicated and cumbersome in the mass production of articles and is too expensive in view of high labor costs. In addition, improper storage and mounting of the diaphragm can result in damage to the diaphragm edge. It is a further disadvantage that the diaphragm and the frame are produced in separate machines and according to a relatively expensive die casting method.

This reference teaches that the collector lens is inserted from below into an opening of the upper side of the frame and lies with its outer flange at the edge of the opening. The attachment of the collector lens at the frame can be achieved by adhesive methods or by spring sheet metal which rests against the outer flange under pretension. The spring sheet metal can be solidly riveted or screwed to the frame. The insertion of the collector lens between the legs into an opening of the frame and the attachment of the collector lens by adhesive gluing, riveting and screwing is cumbersome and time consuming. In addition, if the frame is damaged, the collector lens cannot be demounted since it is attached by riveting or gluing. In the case of a screw connection, a safe fixed position of the collector lens is not always assured.

SUMMARY OF THE INVENTION

1. Purposes of the Invention

It is an object of the present invention to provide an improved motor vehicle headlight that does not require a cumbersome mounting of the diaphragm and that avoids damage to the diaphragm edge as far as possible without increase in production equipment expenditures.

It is another object of the present invention to provide for an optimum adjustment method for the diaphragm edge generating the light-dark boundary of a motor vehicle headlight.

It is yet a further object of the present invention to form a frame for a motor vehicle headlight that solidly connects reflector, diaphragm, and collector lens in a unit such that the collector lens can be mounted and demounted from the front in a quick and simple way.

It is yet another object of the present invention to provide a reflector with an attached frame resulting in a safe and secure mounting of a required collector lens.

These and other objects and advantages of the present invention will become evident from the description which follows.

2. Brief Description of the Invention

In accordance with the present invention there is provided a dimmed motor vehicle headlight comprising a light-focussing reflector, a light source disposed at a focal point of the reflector, a frame mounted in front of the reflector, a diaphragm having an edge disposed near a second focal point of the reflector and forming a single piece with the frame, and a collector lens.

The frame is formed of a beaker-like sheet metal piece having a cut out floor section and including arm-like webs cut out of the wall of the beaker with some of the arms furnishing support arms of the frame. The cut-out floor section of the frame supports the collector lens.

The diaphragm is formed by bending a web inwardly relative to the beaker configuration such that the end edge of the bent web forms a light-dark border.

The reflector can be of ellipsoidal shape where the light source can be disposed in one focal point of the reflector and the collector lens can be disposed behind a second focal point. The diaphragm can be adjustable in its position, and an upper edge running substantially in a horizontal direction generates a light-dark boundary.

Support elements for the diaphragm can be formed from ends of webs disposed next to the web forming the diaphragm. After positional adjustement, the diaphragm can be set in its position by a junction with the webs serving as supporting elements for the diaphragm, where the diaphragm can be joined to the neighboring webs by laser welding.

The diaphragm can further comprise a tongue bent in the direction of the collector lens and angled and formed in the direction of the collector lens, which can be joined in each case to a respective neighboring support element. The tongues of the diaphragm can be adapted with their outside surfaces for sliding along an edge in each case of a support element, and a respective tongue can be welded to an edge of a respective support element after adjustement of the position of the diaphragm.

The webs providing the support elements of the diaphragm can be provided in each case with a connection piece inwardly receding and having its free end section adjacent to the outwardly directed surface of a respective tongue. The inwardly receding connection pieces of the webs and the diaphragm at the free ends of the tongues can be furnished with a guide bevel edge.

The free end section of the web providing the diaphragm can be adjustable by bending about a set bending edge where the set bending edge can be provided by a mechanically weakened section of the web. The set bending edge can be weakened by an opening placed in a respective area of the web. The edge of the diaphragm is to be disposed precisely at the focal point of the collector lens for precise imaging of the diaphragm edge by the projector lens. The precision of the diaphragm edge should be a few tenths of a millimeter.

A diaphragm element plane after bending preferably forms an angle of less than 90 degrees relative to a plane intersecting the optical axis at a right angle.

The web forming the diaphragm can be formed as a planar piece with a bend toward the area of a focal point, and a transition from a cylindrical jacket surface of the frame to a planar extending section of the web can be effected by a mechanically forced deformation. The transition from a cylindrical jacket surface of the frame to a planar extending section of the web can be generated by a peening flange formation, where a straight running bending line of a web angled relative to the reflector can be a tangent to the arcuately curved line of the peened flange.

Stiffening ribs can be disposed in the web serving as a diaphragm.

According to another aspect of the present invention, there is provided a dimmed motor vehicle headlight comprising a light-focusing reflector with a light source disposed at one focal point, a lens for focussing light, and a ring shaped frame mounted in front of the reflector. The ring shaped frame forms a circle and narrows its inner diameter in the direction of light outflow. A smaller inner diameter of the ring-shaped part corresponds to an outer diameter of the lens. Radially inwardly receding connection pieces distributed over the circumference of the ring shaped frame form support points for the lens, which is inserted from the side with the smaller inner diameter. A cracked ring, disposed between the radially protruding connection pieces and the inwardly narrowing ring shaped frame under pretensioning, is pressed against a slot formed by the lens and the ring shaped frame part and, without resting at the base of the slot, presses the lens against respective support points.

The reflector can be of ellipsoidal shape. The light source can be disposed in a focal point of the ellipsoidal reflector and the collector lens disposed behind a second focal point of the ellipsoidal reflector. The diaphragm can be adjustable in its position, and an upper edge running substantially in a horizontal direction can generate a light dark boundary.

Radially inwardly directed protrusions can be furnished at the ring shaped frame between a plane generated by the support points of the lens and the ring shaped frame end with the smaller diameter, where the faces of the protrusions directed toward each other serve as a centering surface for an outer edge of the lens.

For a frame made of sheet metal, a recess can be placed in the ring shaped frame above the connection pieces and the protrusion in each case. The connection pieces and the protrusions can be formed by regions cut free from the ring shaped frame, and the connection pieces and protrusions can be formed by radially inwardly directed areas.

The ring shaped frame can have the shape of a truncated cone between the largest and the smallest inner diameter.

Alternatively, the ring shaped frame can have the shape of a sphere section between the largest and the smallest inner diameter.

The cracked ring can rest under pretension at a front surrounding edge of the collector lens, and the forces of the cracked ring thus acting on an edge can be directed to a common point of the optical axis.

The outer surrouding edge of the collector lens against which the cracked ring rests under pretension can provide a radius or a bevel.

According to a further aspect of the present invention, there is provided a method of adjusting a dimmed motor vehicle headlight. An outer support element is disposed at a frame where a diaphragm forms a single piece with the frame and has tongues on the sides of a light limiting edge. The tongues of the diaphragm are slid with their outer surfaces along an edge of a support element until the position of the diaphragm edge is properly adjusted, and, after positional adjustment of the diaphragm, the tongue is welded to a respective support element. A piece of the diaphragm can be bent such that a planar diaphragm section adjoining the dimming edge of the diaphragm forms an angle of from about plus to minus 20 degrees relative to a plane perpendicular to the optical axis.

According to the disclosure of the present invention, the diaphragm can be adjusted by setting a web forming an angle with respect to the optical axis in order to provide a properly positioned diaphragm edge. Such adjustment can be effected by application of one or more sequentially operating devices in order to effect a desired positioning of the edge of the web relative to the hight level and/or the direction assumed by the edge of the diaphragm. In addition, the frame provided in beaker shape is of a substantial stiffness and supports without vibration the relatively large mass of the lens.

In order to counteract a springing back of the diaphragm after adjustment, it is advantageous if the two webs neighboring to the diaphragm serve as supporting elements for the diaphragm.

According to a preferred embodiment of the present invention, the free end section of the web serving as a diaphragm is adjustable by bending around a set bending line that is formed by a section of the web which is weakened in its cross section. It is advantageous in this context if the region of the web forming the set bending line is weakened by at least one opening made in the web. Thereby, the action of a small force can simply and easily tilt the diaphragm around the set bending line into its optimum position for a rigid unit reflector collector lens.

In addition, it is advantageous if, after the adjustment, the diaphragm can be fixed at webs providing support elements. This can be achieved for example by screwing, riveting, soldering or welding. For mass production, welding appears to be advantageous, since welding can be easily and quickly performed and furthermore results in a safe and permanently fixed connection. Laser welding is particularly advantageous in automatic production, since the welding without contact allows the diaphragm to be fixed in a precisely set position.

The contactless welding can for example be performed with a pulse laser having a wavelength of 1.06 micrometers. This laser can be positioned at a distance of for example from about 80 to 150 centimeters from the diaphragm and the welding can be performed according to the edge melt process (compare for example: "Fügen in der Feinmechanik und Mikrotechnik (Joining in precision mechanics and microtechnique)", A. De Paoli, Stuttgart, Verband deutscher Ingenieure VDI-Bildungswerk, BW 4899). Employing this process, the quality of the weld is not substantially degraded because of the galvanized surface of the steel sheet metal employed.

The welding point diameter can be from about 5 to fifteen millimeters and preferably the diameter is set to 0.8 millimeter plus minus 0.3 millimeter. Several individual points results in a seam corresponding to the length of the support element. In case laser welding is employed the tongue can be dispensed with.

It is a further advantage if the diaphragm is provided with a tongue at each of its side edges, which in each case is angled toward the collector lens. The tongues of the diaphragm slide with their outwardly directed surfaces in each case along an edge of a support element, and, after the adjustment of the diaphragm, the tongue is fixed at the edge of a respective support element by way of welding. In this way, even in the case of an automatic production, the welding device can be precisely directed to the welding spot formed by the edge of the respective support element in each case. It is further advantageous if the webs of the diaphragm serving as support elements are provided in each case with a cut free and inwardly receding connection piece which rests with its free end section at the outwardly directed face of the respective tongue. In such an embodiment, gaps resulting from forming the frame can be bridged between the webs serving as support elements and the respective tongue of the diaphragm in each case. In addition, it is advantageous if the inwardly receding connection pieces of the webs and the diaphragm are provided at the free ends at the tongues in each case with a guide bevel surface.

Upon angling of the web serving as a diaphragm, the guide bevel surfaces serve to guide the diaphragm between the neighboring support elements. A further advantage results if the diaphragm forms an acute angle relative to a plane running perpendicularly to the optical axis. Therewith, in the case of automatic production, the diaphragm is to be pressed by a device always only in the direction of the collector lens or of the reflector.

According to a particularly advantageous embodiment of the invention, the web forming the diaphragm is provided as a planar piece, where the transition from the cylindrical jacket surface to the planar running diaphragm is generated by peening. It is advantageous in this context if the straight running bending line of the web angled toward the reflector is tangent to the arcuately curved running line of the peening or is disposed at a distance relative to the arcuately curved running line. Such a planar produced web can be angled easily relative to the optical axis. In addition, the thus resulting course of the diaphragm edge is optimally in a plane standing perpendicularly relative to the optical axis.

According to an advantageous embodiment of the present invention, the lens can be easily and quickly mounted by automatic means, since the lens can be inserted from the outside into a receiving opening of the frame and can be set in a securely fixed position by a simple cracked ring. The demounting of the collector lens is possible in case of a damaged frame, since it can be pressed out of the ring by applying a substantial force.

It is further advantageous if, between the plane formed by the supporting points and the ring end with a smaller diameter, the ring is provided with radially inwardly directed protrusions distributed over the circumference. The surfaces of the protrusions are directed toward each other and serve as centering faces for the outer edge of the lens. Thus the lens is centered after its insertion into the receiving opening of the frame.

It is furthermore advantageous if, for a frame produced by a die casting method, in each case a recess if provided in the ring above the connection pieces and the protrusions. This eliminates a requirement of adjustable tool parts for providing form changes in this region.

It is furthermore advantageous if, in the case where a frame is provided of sheet metal, the junction pieces and the protrusions are formed by cutting them free from the ring end from the radially inwardly directed bent regions. Such a frame can be produced very economically from sheet metal. It is a further advantage if the ring is formed as a truncated cone or as a ball section in the area between the largest and smallest inner diameter. In the case of such an embodiment, the cracked ring presses the collector lens with a relatively large force against the junction points of the frame serving as support points.

According to a particularly advantageous embodiment of the invention, the cracked ring rests at the front outer surrounding edge of the collector lens under pretensioning. The forces of the cracked ring thereby acting on the edge are directed toward a joint point on the optical axis. It is advantageous in this context if the outer surrounding edge of the collector lens, at which the cracked ring rests under pretensioning, is provided with a a bevel. Here the collector lens is not only fixed by the cracked ring in axial direction but also in radial direction. The fixing of the position of the collector lens in radial direction results in an accurate centering of the collector lens relative to the optical axis.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
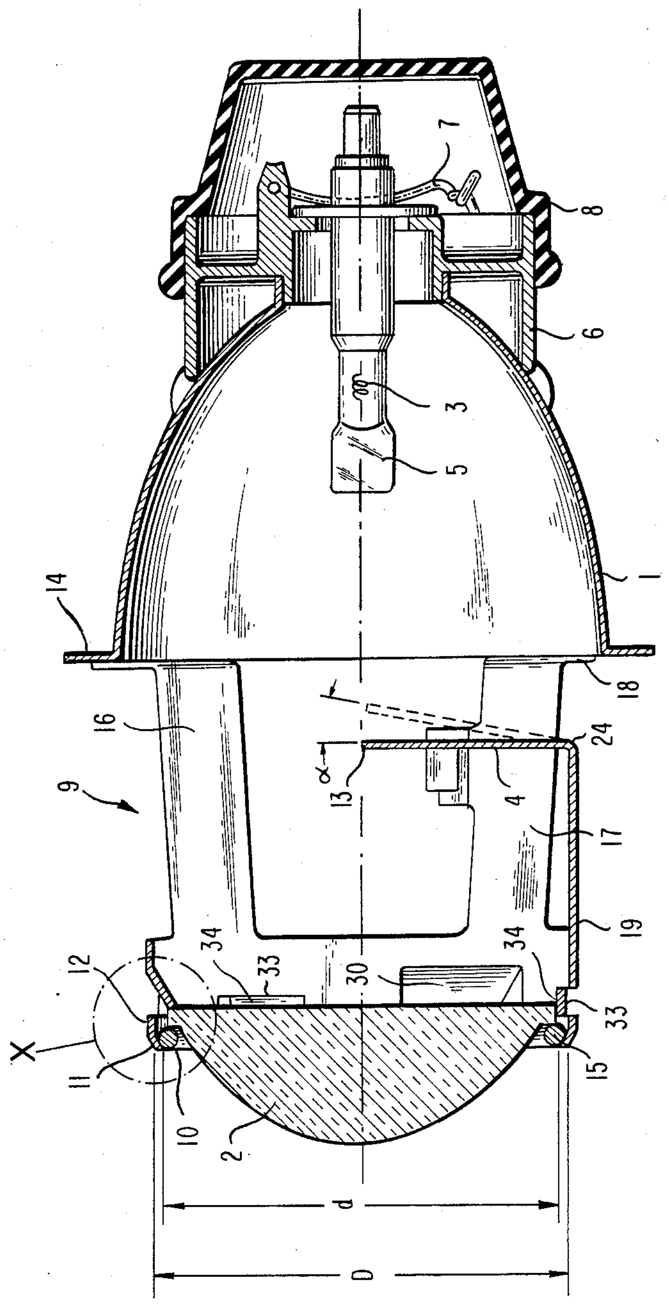
FIG. 1 is a schematic view of vertical longitudinal section along the optical axis of a motor vehicle headlight through a collector lens, diaphragm, and reflector.
Figure 3:
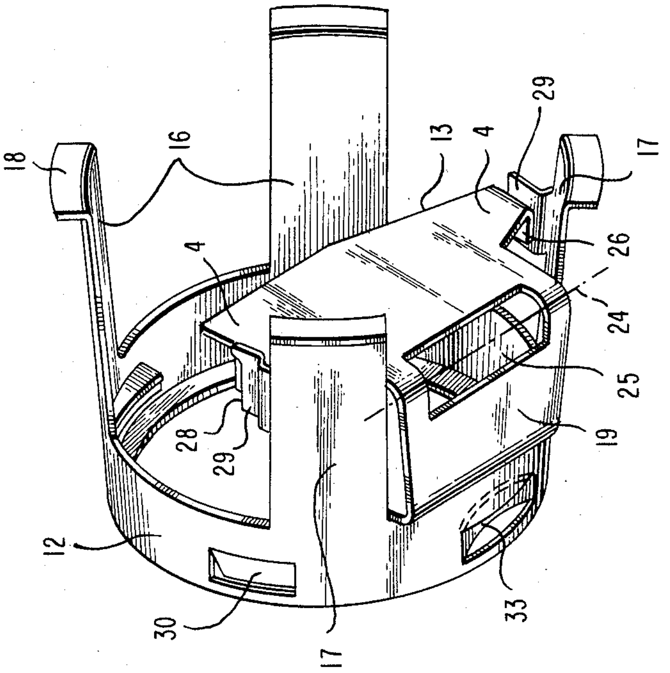
FIG. 3 is a perspective view of the frame according to FIG. 2 from a different direction.
Figure 2:
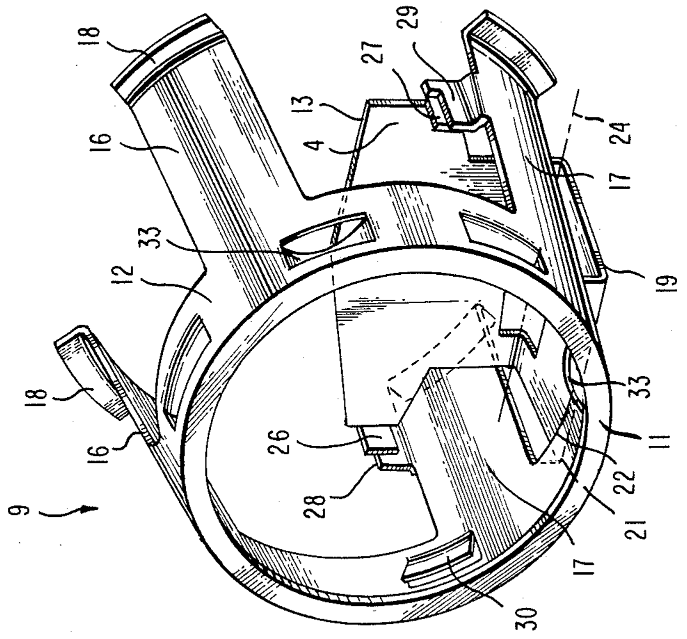
FIG. 2 is a perspective view of the frame with the diaphragm formed as a single piece.

In accordance with the present invention, there is provided a dimmed motor vehicle headlight with an ellipsoidally shaped reflector. The light source is disposed in a first focal point of the reflector. A collector lens is supported by a frame connected to the reflector. The lens is disposed in an annular part of the frame behind the second focal point and in the path of the light beam. A diaphragm is provided in the path of the light ahead of the collector lens and in the focal point of the collector lens. The diaphragm is adjustable in its position and its upper substantially horizontally running edge generates the light-dark boundary.

The frame 9 and the diaphragm 4 are formed as a single part. The frame 9 is formed by a beaker shaped sheet metal part, where the cut out floor 10 serves to support the lens and where the wall 12 forming a jacket face is cut free to provide arm shaped webs 16, 17, 19. One of these webs 19 is angled toward the optical axis in such a way that its upper edge 13 forms the diaphragm edge generating the lightdark bondary. The other webs 16, 17 form the support arms of the frame 9.

The two webs 17 neighboring the diaphragm 4 serve as support elements of the diaphragm 4. The free end section of the web 19 forming the diaphragm 4 is adjustable around a set bending line 24 for providing adjustments. The set bending line 24 is preferably provided by a section of the web 19 that is weakened in its cross section. The region of the web 19 forming the set bending line 24 is preferably weakened by at least one opening in the web 19. The diaphragm 4 can be fixed in its position after positional adjustment at the webs 17 providing support elements. The diaphragm 4 can be fixed at the support elements by laser welding.

The diaphragm 4 can be provided at its side edges in each case with a tongue 26 angled relative to the collector lens 2. The tongue in each case can be fixed to a respective neighboring support element 17. The tongue 26 of the diaphragm 4 with its outwardly directed surfaces can slide along an edge 28 of a support element 17 during adjustment of the diaphragm 4. After adjustment of the diaphragm 4, the tongue 26 can be fixed by welding at an edge 28 of the respective support element. The webs 17 of the diaphragm 4 serving as support elements can be provided in each case with a cut free and inwardly receding extension 29, which rests with its free end section 28 in each case at the outwardly directed face of the respective tongue 26.

The inwardly receding extensions 29 of the webs 17 and the diaphragm 4 can be provided at the free ends of the tongues 26 in each case with a guide bevel section.

The diaphragm 4 can form an acute angle after angling relative to the plane disposed perpendicularly to the optical axis. The acute angle can be up to about 20° and preferably is less than 10° and advantageously less than about 4 degrees. The web 19 forming the diaphragm 4 can be a planar piece. The transition from the cylindrical jacket face 12 to the planar running plane 4 can be generated by a stretching or pressure ring deformation. The transition 13 can furthermore be generated by peening or flanging.

The straight running bending line 21 of the web running toward the reflector 1 can be a tangent to the arc shaped running line 22 of the flanging, or it can be disposed at least next to it. The web 19 serving as a diaphragm 4 can be provided with stiffening ribs.

According to a further embodiment of the invention, the frame 9 can be of circular shape in its annular part 12. At least a part 11 of the ring 12 can narrow in the height of its inner diameter as seen in the direction of outgoing light. The smaller inner diameter d of the annular part 12 can correspond to the outer diameter of the lens 2. The ring 12 is preferably provided with extensions 30 protruding radially inwardly along the circumference. The radially protruding parts 30 serve as support points for the lens 2 inserted from the smaller inner diameter d. A cracked ring 15 is inserted between the lens 2 and the inwardly narrowing ring 12 under pretension. The cracked ring 15 is pressed into a slot formed by the lens 2 and the ring 12 without the cracked ring resting at the bottom of the slot. The cracked ring presses the lens 2 against the support points 31.

Preferably the ring 12 is provided with radially inwardly directed protrusions 33 distributed over the circumference between the plane formed by the support points and the end of the ring 10 with a smaller diameter. The faces 34 directed toward each other serves as centering faces for the outer edge of the lens 2.

For a frame 9 produced by die casting, in each case a recess is provided at the ring 12 above the extensions 30 and the protrusions 33. For a frame 9 produced from sheet metal, the extensions 30 and the protrusions 33 are formed from regions cut free from the ring 12 and bent inwardly in radial direction. The ring 12 can have the shape of a truncated cone or of a ball section between the largest and the smallest inner diameter. The cracked ring 15 can rest at the front outer surrounding edge 35 of the collector lens 2 under pretensioning. The forces of the cracked ring 15 thus acting on the edge 35 are directed to a common point on the optical axis. The outer surrounding edge 35 of the collector 2, at which the cracked ring 15 is resting under pretensioning, can be provided with a radius or a bevel.

Referring now to FIG. 1, there is shown a motor vehicle headlight comprising substantially an ellipsoidal reflector 1 and a diaphragm 4 disposed between the collector lens 2 and the reflector 1. The inner reflection face of the reflector 1 forms in axial longitudinal sections in each case a semi-ellipsoid. The incandescent lamp wire 3 of an incandescent lamp 5 is disposed in the focal point of the semi-ellipses. The incandescent wire 3 is supported by a lamp socket 6. The lamp socket 6 is adhesively attached to the back side of the reflector, is of ring shape, and is inserted into the vertex opening of the reflector 1. The incandescent lamp 5 is fixed in position in the lamp socket 6 by a spring 7 resting in the socket dish under pretension. A cover plate 8 is placed onto the annular shaped lamp socket 6. Preferably the cover plate 8 is made of rubber. The edge 13 of the diaphragm 4 generating the light-dark boundary is disposed in the focal point of the collector lens 2.

A beaker or cup shaped frame 9 made from sheet metal according to a deep drawing method is attached at the outwardly placed surrounding reflector edge 14. The beaker shaped frame 9 narrows toward the floor surface 10 conically and carries a collector lens 2 inserted from the side of the cut out bottom face 10.

The wall of the frame 9 is formed by a jacket surface and is cut open into four arm shaped webs 16, 17. The free ends of the webs 16, 17 are angled toward the outside and are welded to the outer surrounding reflector edge 14. A further web 19 cut free from the beaker shaped frame 9 is positioned between the webs 17. The web 19 is formed as a planar piece and forms with its free end section, which is angled toward the optical axis, the diaphragm 4. The transition from the cylindrical jacket face 12 toward the planar running web 19 generates an edged connection of the web 19 towards the outside. Adjacent to the peened region, the planar running web 19 is angled crosswise relative to its longitudinal direction toward the reflector 1. Here the bending line 21 of the angling is tangent to the arcuate curve of the running line 22 of the peening and flanging. After the angling relative to the optical axis, the free end section 13 of the web 19 forming the diaphragm 4, as illustrated in the drawing by dashed lines, stands at an acute angle of less than about 20 degrees and preferably of less than about 10 degrees set to for examle to about 4 degrees relative to a plane running perpendicularly to the optical axis. Thereby, in the case of an automatic production, only a simple device is required to adjust the diaphragm, since the diaphragm 4 has to be moved always only in the direction toward the collector lens 2. The free end section 13 angled toward the optical axis and serving as a diaphragm 4 can be more easily adjusted around the set bending line if the web 19 is weakened in this region by a opening 25 with rectangular shape.

An adjustment of the position of the diaphragm edge 13 can be provided by adjustment of the diaphragm 4 around the bending edge 24. Thereby the diaphragm edge migrates on the optical axis of the headlight system, and in fact in the direction of the axis. The height level of the diaphragm edge can be adjusted by bending of the of the web 19, at which the diaphragm edge is supported and located, in the direction of the optical axis or in opposite direction. The diaphragm edge is adjusted such that it is located precisely on the optical axis. Furthermore, an adjustment of the position of the diaphram edge 4 can be achieved by forcing a torsioning motion to the web 19. This allows to raise the level of either the right or left edge of the diaphragm 4. The forces required for effecting the position adjustement of the diaphragm have to be coordinated to the quality of the sheet metal, the thickness of the sheet metal, the relative geometrical configuration, number and construction of stiffening ribs. The incorporation of stiffening ribs 39, 40 serves to damp vibrations. The stiffening ribs 39 stiffen the web 19 and the diaphragm 4 and the stiffening ribs 40 prevent a springing back during adjustment of the diaphragm.

The diaphragm 4 is provided on its sides in each case with tongue 26 angled toward the collector lens 2. The tongue rests with its outwardly directed face 27 at the edge 28 of an extension 29 that is formed by a web neighboring the diaphragm 4 and cut free to form an inwardly receding bent tab. The outwardly directed faces 27 of the tongues 26 slide at the respective edge 28 of the tab 29 during adjustment of the diaphragm 4. After the adjustment of the diaphragm 4, the edges 28 of the tabs 29 are fixed in position at the outwardly directed faces of the tongues 26 by laser welding. This is particularly advantageous in the case of automatic production, since the laser welding device does not have to follow the readjusted diaphragm 4 but can always be directed toward one of the fixed position edges 28 of the tabs 29.

The lens support is preferably provided by a deep drawing method processing preferably a steel sheet of the standardized quality ST 14 IF having a thickness of 1 millimeter plus minus 0.5 millimeter. The sheet is galvanized with zinc of a thickness of 7.5 micrometers in order to prevent corrosion. This thickness of a zinc layer and the deep drawing process are both advantageous for obtaining a good quality of a welding seam.

Figure 4:
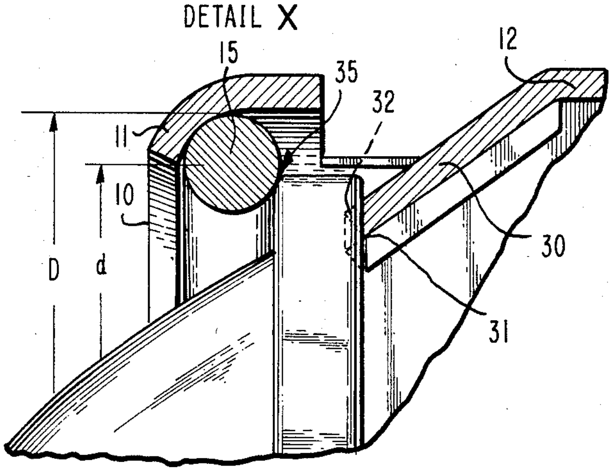
FIG. 4 is a detail X of FIG. 1.

The annular part 12 of the frame 9 is cirular and in the part 11 narrows its height in its inner diameter as seen in the direction of outcoming light. The ring 12 is provided with the shape of a ball section between the largest and smallest inner diameter D and d. The collector lens inserted in the ring 12 from the side of the smaller inner diameter d rests uniformly at the circumference at the extensions formed by tongues 30 that are uniformly distributed along the circumference. The extensions are cut free from the ring 12 and radially bent inwards. The front faces 31 of the tongues 30 directed toward the collector lens 2 serve as support points for the collector lens 2. It is advantageous in this context if the free ends 32 of the tongues 30 are for example remilled by cutting off such that the rest points 31 for the collector lens 2 are disposed in a plane located exactly perpendicular to the optical axis. The cut off free end of the tongue 30 is shown by dashed lines in detail X of FIG. 4. The radially inwardly directed protrusions 33 are inserted in the ring 12 between the tongues 30 between the plane formed by the rest points of the tongues 30 and the end of the ring 10 with the smaller diameter d. The protrusions 33 form a strip cut free from the ring 12. The longitudinal directions of the protrusions 33 are perpendicular to the optical axis, and they take on an arcuate curve shape due to pressure from the outside. The faces 34 of the strips 33 directed toward each other serve for precentering of the collector lens 2. In order to fix the position of the collector lens 2 in the ring 12, a cracked ring 15 is inserted under pretensioning between the collector lens 2 and the inwardly narrowing part 11 of the ring 12. The cracked ring 15 presses itself into a slot formed by the collector lens 2 and the ring 12 without resting at the base of the slot. The cracked ring 15 rests under pretension at the collector lens 2 at the front outer surrounding edge 35 having a radius. Here the forces acting on the edge 35 of the collector lens 2 are directed toward a common point on the optical axis.

Figure 6:
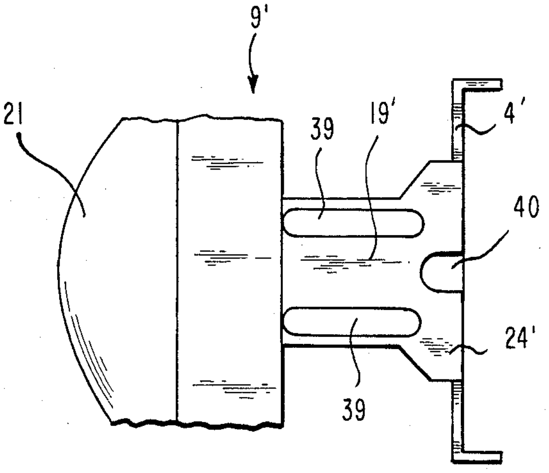
FIG. 6 is a schematic detail view from the direction Y onto the bottom side of the diaphragm shown in FIG. 5.
Figure 5:
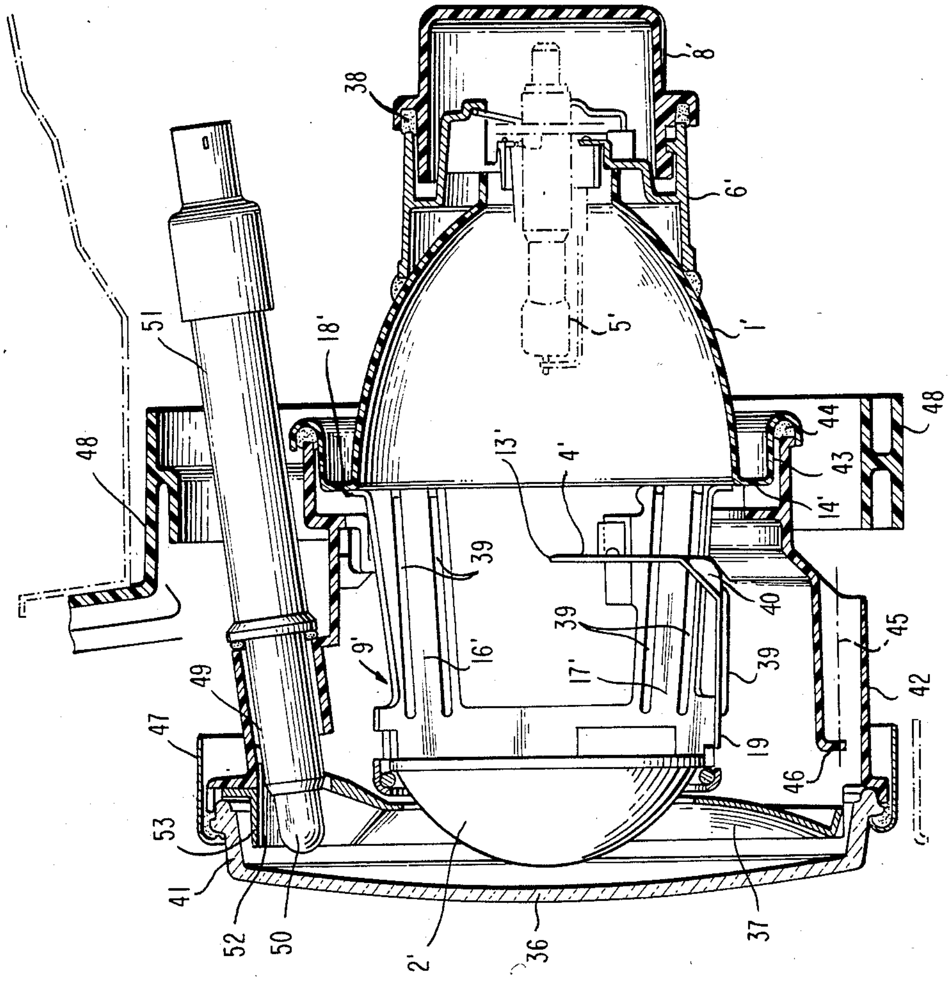
FIG. 5 is a longitudinal sectional view of another embodiment of a headlight according to the present invention.

Another embodiment of the present invention is illustrated in FIG. 5 and FIG. 6 of the drawing. The motor vehicle headlight comprises essentially an ellipsoidal reflector 1' made from plastic. It comprises further frame 9 carrying the diaphragm and the lens, a large face light transmitting disc 36 covering the lens 2 and a ring shaped cover plate 37 disposed at a distance relative to the light transmitting disk 36.

The lamp socket 6' carrying the light bulb 5' is inserted in the opening at the vertex of the elipsoidal reflector 1' and is adhesively attached to the back side of the reflector. A cup 8' produced from plastic is placed onto the lamp socket 6' with an intermediate disposition of an annular seal 38. Webs 16' and 17' cut free from the cup shaped frame 9' are attached with the outwardly angled free end 18' at the edge region 14' of the reflector 1' surrounding the reflector surface. The web 19' cut from the frame 9' and formed as a planar piece is angled toward the optical axis and serves with its free end section as a diaphragm 4'. Two stiffening ribs 39 running in each case in the direction of the longitudinal extention of the webs are entered into the webs 16', 17' and 19' of the frame 9'. The stiffening rib 40 is applied into the web 19' at the bending line 24' of the diaphragm 4' angled toward the optical axis. Thus the diaphragm 4' is provided in the region of its bending line 24' with high stiffness such that it does not spring back into its starting position after the adjustment of the bending of the diaphragm edge 13' that is after the tilting of the diaphragm 4 around its bending line. The floor of the cupshaped frame 9' is cut out and serves as the receptical for the lamp 2'.

The outer edge 41 receding backwardly of the light transmitting plate 36 is adhesively attached to a tubular plastic part 42 together with the ring shaped cover 37 disposed at a distance relative to the light transmitting disk 36. A screw connection not shown in the drawing between the reflector 1′ and the tubular plastic part 42 presses the edge of the tube shaped plastic part directed to the reflector 1′ against ring seal 44 inserted into the outer edge region 43 of the reflector 1′ receding rearwardly. The reflector 1′ produced from plastic exhibits based on the rearwardly receding outer edge region 43 has a sufficiently large stiffness in order to be able to carry the frame 9′ of the diaphragm 4′ and the collector lens 2′ without vibrations.

The tubular plastic part 42 is provided at its lowest point with a flow-off opening 45 for condensated water collected in the interior of the headlight. The flow-off opening 45 is provided at the lowest point of the tube shaped plastic part 42 for water condensated and collected in the interior of the headlight. The flow-off opening 45 is provided with baffle plate 46 narrowing the cross-section o the flow-off opening 45. The baffle plate 46 protects the interior space of the headlight against dirt and splashing water. The light transmitting plate 36 is surrounded by a decorative ring 47, which grips automatically and lockingly engaging the edge of the tubular part 42 adhesively attached to the light transmitting plate 36 upon placing of the light transmitting plate 36. The headlight is inserted into frame 48 made from plastic and can be tilted around two adjustment axes provided by two adjustment elements and a fixed point, which axes are set relative to each other at angle of 90 degrees.

The ring shaped cover 37 is produced from sheet metal and is formed like a shell, where the concave side is directed to the light transmitting plate 36 and is provided with a high gloss surface. In each case an opening 49 for receiving of the position indicating incandescent light bulb 50 is provided in the cover 37 and in the tubular part 42. A change of the position indicating incandescent light bulb 50 can be easily and frequently performed with a rod-shaped tube 51 protruding into the motor space. The reflection region of the cover 37 around the light bulb 50 is shaped like a valley. The valley shaped recess 52 forms a reflector tuned to the position of the filament of the light bulb 50. The remaining reflection region of the shell shaped cover 37 is constructed such that the part of the light exiting from the position indicating light bulb 50 impinges on the cover plate 37 and is reflected from the cover plate 37 as uniform as possible into the light exit opening. The outer surrounding edge 53 of the cover plate is provided receding toward the rear side in order to obtain a reflection surface as large as possible based on the shell shaped cover 37.

It will be understood that each of the elements described above, or two or more together, may also find a useful application in other types of headlights differing from the types described above.

While the invention has been illustrated and described as embodied in the context of a dimmed motor vehicle headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A dimmed motor vehicle headlight operable to be mounted on the front of a motor vehicle and having a standard orientation at a motor vehicle comprising:

a light-focussing reflector with a source of light at a focal point of said reflector;

a lens for focussing light;

a stamped sheet metal cup-like frame defining a centermost axis and comprising: first and second open ends, a plurality of arm-like webs extending between said ends, said first end mounted on front of said reflector wherein the lens is supported by said second end via radially inwardly receding connection pieces distributed over the circumference of a ring shaped frame forming support points for the lens inserted from the side with the smaller inner diameter, and a diaphragm having an edge disposed intermediate said ends to form a light-dark border, said diaphragm formed by bending a web having a free end toward said axis, where the frame narrows its inner diameter in the direction of light outflow, where a smaller inner diameter of the ring-shaped part corresponds to an outer diameter of the lens;

a cracked ring disposed between the radially protruding connection pieces and the inwardly narrowing ring shaped frame under pretensioning, where the cracked ring is pressed against a slot formed by the lens and the ring shaped frame part without resting at the base of the slot and where the cracked ring presses the lens against respective support points.

2. The dimmed motor vehicle headlight according to claim 1 wherein:

the reflector is of ellipsoidal shape;

wherein the collector lens is disposed opposite a second focal point of the ellipsoidal reflector relative to the reflector; and wherein the diaphragm is adjustable in its position and where an upper edge running substantially horizontal generates a light-dark boundary disposed in a plane orthogonal to the axis.

3. The dimmed motor vehicle headlight according to claim 1 further comprising:

radially inwardly directed protrusions furnished at the ring shaped frame between a plane generated by the support points of the lens and the ring shaped frame end with the smaller diameter, where the faces of the protrusions directed toward each other serve as a centering surface for an outer edge of the lens.

4. The dimmed motor vehicle headlight according to claim 1 wherein said lens is supported from its rear and sides by extensions and protrusions formed in said frame.

5. The dimmed motor vehicle headlight according to claim 1 wherein the connection pieces and the protrusion are formed by portions cut free from the ring shaped frame and where the connection pieces and protrusions are formed by radially inwardly directed areas.

6. The dimmed motor vehicle headlight according to claim 1 wherein the ring shaped frame has the shape of a truncated cone between the largest and the smallest inner diameter.

7. The dimmed motor vehicle headlight according to claim 1 wherein the ring shaped frame is formed of four webs between the largest and the smallest inner diameter.

8. The dimmed motor vehicle headlight according to claim 1 wherein the cracked ring rests under pretension at a front surrounding edge of the collector lens at said second end and where the cracked ring engages and edge with forces directed away from said axis.

9. The dimmed motor vehicle headlight according to claim 1 wherein an outer surrounding edge of the collector lens against which the cracked ring rests under pretension is formed as a flange.

10. A dimmed motor vehicle headlight operable to be mounted on the front of a vehicle and comprising:

a light-focussing reflector with a source of light at a focal point of said reflector; and a stamped sheet metal cup-like frame defining a centermost axis and comprising: first and second open ends, a plurality of arm-like webs extending between said ends, said first end mounted on front of said reflector wherein a lense is supported by said second end, and a diaphragm having an edge disposed intermediate said ends to form a light-dark border, said diaphragm formed by bending a web having a free end toward said axis.

11. The headlight according to claim 10, wherein said reflector lies on ellipsoidal surface which has a second focal point intermediate said ends, and wherein said edge is disposed in a plane orthogonal to said axis.

12. The headlight according to claim 11, wherein said frame further comprises support elements for said diaphragm extending from intermediate portions of arm-like webs which are adjacent said diaphragm.

13. The headlight according to claim 12, wherein:

said support elements are connected to said diaphragm by laser welds.

14. The headlight according to claim 13, wherein said support elements are connected to tongues bent to extend toward said second end from sides of said diaphragm.

15. The headlight according to claim 14, wherein said connections are weld joints formed between edges of said support elements and surfaces of said tongues which face away from said axis.

16. The headlight according to claim 15, wherein said support elements have portions joined to and offset from said intermediate portions, and where free ends of said support elements define said support element edges.

17. The headlight according to claim 10, wherein the diaphragm is bent about a predetermined line defined by a mechanically weakened section of said diaphragm web.

18. The headlight according to claim 17, wherein said weakened section results from a hole therein.

19. The headlight according to claim 10, wherein said diaphragm is generally planar.

20. The headlight according to claim 19, wherein said diaphragm lies in a plane not orthogonal to said axis.

21. The headlight according to claim 19, wherein said diaphragm is connected to a cylindrical jacket defining said second end by a transitional planar section.

22. The headlight of claim 21, wherein said transitional planar section is a peened flange.

23. The headlight according to claim 10, wherein diaphragm web is provided with stiffening ribs.

24. A method of adjusting a dimmed motor vehicle headlight comprising:

providing support means at a first axial end of frame for supporting said frame on a headlight providing a diaphragm forming a single piece with said frame and having perpendicular tongues on the sides of a light limiting edge;

said diaphragm having a bending line orthogonal to and displaced form a headlight center axis sliding the tongues of the diaphragm with their surfaces which face away from said axis along an adjacent surface of a support element on said frame until the position of the diaphragm edge is properly adjusted; and welding the tongue after positional adjustment of the diaphragm to a respective support element.

25. The method of adjusting a dimmed motor vehicle headlight according to claim 24 where the said sliding step includes bending said diaphragm which is planar so that its diaphragm forms an angle of from about plus to minus 20 degrees relative to a plane perpendicular to the optical axis.

26. A method of setting the degree of dimming of a dimmed motor vehicle headlight comprising the steps of:

(a) providing a light source with a light focussing reflector;

(b) providing a metal frame defining a centermost axis with first and second open ends with support means intermediate said ends and comprising a diaphragm having a free end with sides, and edge extending between said sides, tongues projecting from said sides, and a base defining a bending line;

(c) bending said tongues to be generally perpendicular to said diaphragm;

(d) bending said diaphragm about said bending line such that said diaphragm is operable to block light from said reflector to a predetermined extend and surfaces of said tongues are positioned adjacent said support means; and (e) welding said tongues to said support means.

27. The method according to claim 26, wherein the diaphragm provided is planar and is positioned to lie in a plane forming an angle of no more than twenty degrees with a plane orthogonal to said axis.

* * * * *